United States Patent [19]

Yamada et al.

[11] Patent Number: 4,997,901

[45] Date of Patent: Mar. 5, 1991

[54] REACTION CURABLE COMPOSITION COMPRISING A POLYISOCYANATE COMPONENT AND A POLYOL COMPONENT

[75] Inventors: Ryoji Yamada; Hiroyuki Watanabe; Kazuhiko Kuga, all of Yokohama, Japan

[73] Assignee: Asahi Glass Company, Ltd., Tokyo, Japan

[21] Appl. No.: 168,236

[22] Filed: Mar. 15, 1988

[30] Foreign Application Priority Data

Mar. 17, 1987 [JP] Japan ............... 62-60107

[51] Int. Cl.$^5$ .................. C08G 18/66; C08G 18/65
[52] U.S. Cl. ....................... 528/67; 528/77; 428/425.6
[58] Field of Search ................. 528/67, 77

[56] References Cited

U.S. PATENT DOCUMENTS

| | | |
|---|---|---|
| 3,391,101 | 7/1968 | Kelly et al. |
| 4,377,645 | 1/1983 | Guthrie et al. ............ 521/137 |
| 4,530,990 | 7/1985 | Halpaap et al. ............ 528/67 |
| 4,643,944 | 2/1987 | Agethen et al. ............ 428/349 |
| 4,652,494 | 3/1987 | Bravet et al. ............ 528/67 |
| 4,671,838 | 6/1987 | Bravet et al. ............ 156/246 |
| 4,710,560 | 12/1987 | Vu ............ 528/67 |

FOREIGN PATENT DOCUMENTS

| | | |
|---|---|---|
| 0131523 | 1/1985 | European Pat. Off. |
| 2529559 | 1/1984 | France . |
| 185315 | 11/1982 | Japan . |
| 149624 | 8/1985 | Japan . |

Primary Examiner—John Kight, III
Assistant Examiner—Dennis R. Daley
Attorney, Agent, or Firm—Oblon, Spivak, McClelland, Maier & Neustadt

[57] ABSTRACT

A reaction curable composition comprising, as reactive materials, a polyisocyanate component comprising a diisocyanate and a tri or higher functional polyisocyanate and having an average equivalent molecular weight of from 120 to 240, and a polyol component comprising a diol and a tri or higher functional polyol and having an average equivalent molecular weight of from 100 to 550.

6 Claims, No Drawings

REACTION CURABLE COMPOSITION COMPRISING A POLYISOCYANATE COMPONENT AND A POLYOL COMPONENT

The present invention relates to products having a polyurethane surface layer and to a reaction curable composition useful for forming such a surface layer.

It has been proposed to laminate a synthetic resin film on a glass sheet in order to prevent injuries and scattering of glass fragments when e.g. a glazing glass has been broken. Especially, in the case of a glazing glass of an automobile, such a proposal is considered to be an effective means to improve the safety of the passengers, and various types of bilayer safety glass have been studied wherein an inorganic glass and a synthetic resin film are bonded together.

For instance, U.K. Patent 1,555,144 and U.S. Pat. No. 4,242,403 disclose a bilayer safety glass prepared by bonding e.g. a polyethylene terephthalate film on one side of laminated glass comprising two sheets of inorganic glass bonded with a film of polyvinylbutyral, an ethylene-vinyl acetate copolymer or polyurethane interposed therebetween. Further, U.K. Patent 1,394,271 and U.S. Pat. No. 4,232,080 disclose a bilayer safety glass prepared by bonding a polyurethane film on one side of one sheet of inorganic glass or laminated glass.

On the other hand, it has been proposed that the glass itself be substituted by a synthetic resin material having strong resistance against impact fracture. For example, it is conceivable to use a polycarbonate or acrylic resin having excellent transparency. U.S. Pat. No. 4,435,450 discloses an instance wherein a polycarbonate or acrylic resin provided with a polyurethane coating is used as a glazing material.

In the above proposals, an organic resin is exposed on at least one surface of e.g. glazing glass. Accordingly, the synthetic resin used is required to have the same degree of transparency as inorganic glass. Likewise, it is also required to have a high degree of durability against various types of stimulations such as contamination, abrasion or environmental changes. Among them, the damage due to abrasion is an important problem to be solved, since many materials are not practically useful in this respect.

In general, synthetic resins have a Mohs hardness of about 1 at best. Therefore, they are susceptible to damages under abrasion in the presence of foreign matters. In order to avoid such damages, it has been common to apply hard coat treatment to a synthetic resin surface to improve the surface hardness. Above-mentioned U.K. Patents 1,555,144 and 4,242,403 disclose hard coat treatment applied to a polyethylene terephthalate surface. As opposed to such a method, it is also possible to employ a method wherein the stress due to the foreign matters is to be avoided by an elastic deformation of the surface to prevent damages. This is a method of utilizing a so-called self healing property, which can be effectively obtained particularly when a polyurethane film is used. U.K. Patent 1,394,271 and U.S. Pat. Nos. 4,232,080 and 4,435,450 are directed to the use of this property. Further, in Japanese Unexamined Patent Publication No. 222249/1985, European Patents 132,198 and 131,523 and U.S. Pat. Nos. 4,657,796 and 4,684,694, various attempts have been proposed to improve the polyurethane material for the purpose of improving such a property.

The present inventors are likewise interested in the development of a surface protecting layer effectively utilizing this property of polyurethane.

The self healing property of polyurethane is generally dependent on the material forming the polyurethane and the cross-linking density. However, even when the same material is used, the desired range of the cross-linking density may vary substantially depending upon the type of damages to the substrate. Damages to the substrate surface of e.g. plastics may generally be classified into two types. One is the type where damages are caused by the contact of a moving hard foreign matter with the substrate at a very small area, which is characterized by a large strain imparted to the substrate. Another is the type where damages are caused by the contact of a moving foreign matter with the substrate at a wide area, which is characterized by a small strain imparted to the substrate. For convenience sake, the former will be referred to as scratching damages, and the latter will be referred to as frictional damages. When polyurethane is used as the substrate, a high level of self healing property against frictional damages is usually obtainable by reducing the cross-linking density. On the other hand, a high level of self healing property against scratching damages is obtainable in a very narrow range at a relatively high cross-linking density. In many cases, the range wherein an effective self healing property against frictional damages is obtainable is substantially apart from the range wherein an effective self healing property against scratching damages is obtainable. Heretofore, no material has been obtained which satisfies both requirements.

Further, the change of the cross-linking density substantially affects the stain resistance of the substrate, because the widening of the distance between the cross-linked points by reducing the cross-linking density facilitates the penetration of the staining substance having a certain size into the substrate. Accordingly, in order to impart a high level of stain resistance to the substrate, the cross-linking density is required to be high, which is opposed to the requirement for accomplishing a high level of resistance against frictional damages.

As described in the foregoing, the conventional polyurethane protecting layer had a problem that the frictional damage resistance and the stain resistance as the most important properties for the surface layer can not simultaneously be satisfied to an adequate extent. It is an object of the present invention to solve such a problem and to provide a novel polyurethane-forming reaction curable composition capable of forming a surface layer having high degrees of frictional damage resistance and stain resistance simultaneously, and various products having a polyurethane surface layer obtained from such a composition.

As a result of extensive research with an aim to solve the above-mentioned problem of the conventional technique, the present inventors have found the following interesting fact. Namely, a polyurethane prepared from an isocyanate component comprising a diisocyanate and a tri or higher functional polyisocyanate and having an average equivalent molecular weight of from 120 to 240 and a polyol component comprising a diol and a tri or higher functional polyol and having an average equivalent molecular weight of from 100 to 550, has high degrees of frictional damage resistance and stain resistance at the same time. Thus, the present invention provides a reaction curable composition capable of forming a surface layer excellent in the frictional damage resistance and stain resistance, which is applicable to the surface of glass and/or plastics, and various products having such a surface layer, as described hereinafter.

The present invention provides a reaction curable composition comprising, as reactive materials, a polyisocyanate component comprising a diisocyanate and a tri or higher functional polyisocyanate and having an average equivalent molecular weight of from 120 to 240, and a polyol component comprising a diol and a tri or higher functional polyol and having an average equivalent molecular weight of from 100 to 550.

Now, the present invention will be described in detail with reference to the preferred embodiments.

The reaction curable composition of the present invention is useful for forming a surface layer. Methods for the formation of such a surface layer may generally be classified into two types. One type is a method for forming a surface layer by coating the composition on a substrate, followed by reaction curing on the substrate. The other type is a method wherein the composition is coated and reaction-cured on a support having a releasing surface to form a film or sheet, and such a film or sheet is laminated on a substrate. In the latter type, the film or sheet is laminated to the substrate preferably by means of an adhesive material. In either case, it is preferred to cast the reaction curable composition to form a flat surface, followed by curing to form a cured polyurethane layer. The polyurethane layer is preferably transparent. As the substrate, a sheet or film used for a bilayer safety glass is preferred as mentioned above. However, the substrate is not restricted to such a preferred example. The substrate is preferably transparent or partially transparent. The substrate includes, for example, a sheet or film of inorganic glass or a hard synthetic resin and a film or sheet of a synthetic resin as an intermediate product for the preparation of a bilayer safety glass. Specifically, there may be mentioned an inorganic glass sheet used as a glazing material for an automobile, a laminate comprising two sheets of inorganic glass with an interlayer interposed therebetween, a polycarbonate or acrylic resin sheet or film, a polyethylene terephthalate film or a straight chain or cross-linked polyurethane sheet or film as an intermediate product for the preparation of a bilayer safety glass, or an inorganic glass-synthetic resin laminate. The support having a releasing surface may be a synthetic resin or metal film or sheet having a releasing surface. For example, a polyethylene terephthalate film treated for a releasing property may be mentioned.

The reaction curable composition of the present invention is suitable for the preparation of a bilayer safety glass with one side made of a reaction cured product of this composition, as mentioned above. Further, the product having a polyurethane surface layer of the present invention is preferably a bilayer safety glass. Hereinafter, the present invention will be described primarily with reference to the application to such a bilayer safety glass.

In the present invention, the "equivalent molecular weight" means a molecular weight per one functional group (isocyanate group or hydroxyl group). The "equivalent %" corresponds to the proportion of the number of functional groups. The "polyisocyanate" is a compound having at least two isocyanate groups, i.e. a general term covering a diisocyanate and a tri or higher functional polyisocyanate. Likewise, the "polyol" is a compound having at least two alcohoric hydroxyl groups, i.e. a general term covering a diol and a tri or higher functional polyol. The reaction curable composition of the present invention may contain, in addition to the polyisocyanate component and the polyol component, substantially no other compound reactive with one of them, or if it contains such other compound, the amount should be limited so that no adverse affect will be given to the properties of the resulting polyurethane. As a reactive substance which may be incorporated, a stabilizer such as an ultraviolet absorber having a hydroxyl group may be mentioned.

The polyisocyanate component of the present invention is a combination of a plurality of polyisocyanates including at least one type from each of diisocyanates and tri or higher functional polyisocyanates, and the average equivalent molecular weight is within a range of from 120 to 240. Any polyisocyanate combination may be used so long as the above conditions are met. However, in order to obtain excellent physical properties over a wide temperature range, it is preferred to select the diisocyanate from a group consisting of an aliphatic diisocyanate such as 1,6-hexane diisocyanate, an alicyclic diisocyanate such as 1,4-cyclohexyl diisocyanate or isophorone diisocyanate and a aliphatic branched isocyanate such as trimethylhexamethylene diisocyanate, and the tri or higher functional polyisocyanate from the group consisting of a buret modified product, an isocyanurate modified product and a trimethylol propane modified product of the above diisocyanate. Further, the polyisocyanate component preferably contains at least 3 equivalent %, preferably at least 5 equivalent %, of an isocyanate group derived from the diisocyanate, from the viewpoint of improving the frictional damage resistance of the surface layer. Further, the polyisocyanate component preferably contains at least 30 equivalent %, preferably at least 50 equivalent %, more preferably at least 60 equivalent %, of an isocyanate group derived from the tri or higher functional polyisocyanate, from the viewpoint of improving the stain resistance of the surface layer.

The polyol component of the present invention is a combination of a plurality of polyols including at least one type from each of diols and tri or higher functional polyols, and the average equivalent molecular weight is within a range of from 100 to 550. Any polyol combination may be employed so long as the above conditions are met. Commonly known polyols include polyether polyols such as polyoxypropylene polyol and polyoxytetramethylene polyol; polyether ester polyols which are polyoxytetramethylene polyols containing ester bonds such as hydroxycapronic acid residues; polyester polyols such as a condensation product polyol of ethylene glycol and/or 1,4-butanediol with adipic acid or poly($\epsilon$-caprolactone)polyol which is a ring opening addition product of $\epsilon$-caprolactone; polyhexamethylene carbonate polyols or polycarbonate polyols containing cyclohexadimethanol residues; and polyhydric alcohols such as trimethylol propane, glyceline, 1,6-hexanediol and 1,4-butanediol. Any one of these polyols may be used as the polyol component of the present invention. Particularly preferred polyols are polyester polyols, polycarbonate polyols, polyoxytetramethylene polyols and polyoxytetramethylene polyether ester polyols. These polyols may be used alone or in combination as a mixture of two or more. Also preferred is a mixture of such a preferred polyol with a polyol having a low molecular weight such as a polyhydric alcohol. In order to obtain high degrees of frictional damage resistance and stain resistance, it is preferred to use a diol having an average equivalent molecular weight within a range of from 500 to 3,000 and a tri or higher functional polyol having an average equivalent molecular weight within a range of from 90 to 500. The polyol component preferably contains at least 2% by weight, more preferably at least 5% by weight, of the diol whereby the scratching damage resistance can be improved. Further, the polyol component preferably contains at least 30% by weight, preferably at least 50% by weight, more preferably at least 60% by weight, of the tri or higher functional polyol, whereby the stain resistance can be improved.

The reaction curable composition of the present invention is a mixture of the above reactive materials and includes a mixture subjected to prepolymer preparation. Mixing of the reactive materials is usually conducted by a method wherein a mixture of the polyisocyanate component and a mixture of the polyol component are mixed. For the prepolymer preparation, the entire amount of one of the polyisocyanate component and the polyol component is preliminarily reacted with a part of the other component, or parts of both components are preliminarily reacted to obtain a prepolymer, and to this prepolymer, the rest of the components are mixed. The after-mentioned other components may be mixed at any optional stage during this mixing operation, or they may be preliminarily mixed to one of the reactive materials.

For the preparation of the reaction curable composition, the proportions of the polyisocyanate component and the polyol component are adjusted so that the equivalent amount of the isocyanate group in the polyisocyanate component will be in a range of from 0.7 to 1.3 relative to the equivalent amount of the hydroxyl group in the polyol. However, in order to obtain a stabilized physical properties for a long period of time within a wide temperature range, such a proportion is preferably within a range of from 0.8 to 1.2, more preferably from 0.9 to 1.1. In addition to the polyisocyanate component and the polyol component (including the prepolymer component), the reaction curable composition may further contain other components. Commonly employed as such other components are an organic metal compound catalyst such as an organic tin compound and a tertiary amine compound catalyst. Further, a solvent may be used to reduce the viscosity of the composition. Such a solvent is removed at the time of molding. As the solvent, a ketone solvent such as methyl ethyl ketone, methyl isobutyl ketone, propylacetone or cyclohexanone, dioxane, butyl acetate, ethyl acetate, toluene, xylene or other organic solvents may be mentioned. Further, as optionally incorporated components, various stabilizers such as a ultraviolet absorber, a light stabilizer or an antioxidant, surface property improving agents such as a surface active agent or an adhesion promoting agent as well as a coloring agent, a plasticizer and a flame retardant, may be mentioned.

The reaction curable composition of the present invention is reaction-cured to form a polyurethane. This polyurethane is suitable as the surface layer for a bilayer safety glass. Accordingly, the reaction curable composition is preferably transparent. The reaction curable composition may be colored and transparent so that a colored transparent polyurethane will be obtained.

The reaction curable composition of the present invention may preferably be used in such a manner that it is cast and reaction-cured on a substrate or on a releasing support to form a surface layer bonded to the substarte surface or to form a film or sheet of the reaction cured product. The substrate is preferably a substrate for the production of the above-mentioned bilayer safety glass. The polyurethane film or sheet prepared by means of the releasing support, may preferably be used for lamination to such a substrate. This film or sheet may directly be bonded to a substrate having a surface of a thermoplastic resin such as a straight chain polyurethane or polyvinyl butyral, by heat-pressing. In a case where the substrate has no such adhesive property, an adhesive such as a thermoplastic resin may be used for bonding. The adhesive is preferably transparent and thin. When the substrate is an inorganic glass sheet, a polyurethane surface layer is usually formed on one side of the sheet. When the substrate is a film or sheet of a synthetic resin, the polyurethane surface layer may be formed on one or each side thereof.

The reaction curable composition of the present invention may be employed also for applications other than for a bilayer safety glass. For example, in the same manner as a usual coating material, it may be coated and cured on the surface layer of a substrate made of a synthetic resin, metal or other material, to form a surface layer. In such a case, the polyurethane obtained from the reaction curable composition may not necessarily be transparent. Further, the substrate may not necessarily be a film or sheet, and various forms of substrates may be employed.

The product having the specific polyurethane surface layer of the present invention is preferably a bilayer safety glass. Particularly preferred is a bilayer safety glass wherein at least one of the layers is a layer of inorganic glass or hard organic glass and one side or each side thereof is made of said polyurethane surface layer. When a bilayer safety glass has at least one inorganic glass layer, it is preferred that one side is an inorganic glass surface and the other side is the surface of said polyurethane surface layer, with at least one synthetic resin layer interposed therebetween. The polyurethane surface layer protects the synthetic resin layer and provides excellent surface properties to the inorganic glass-synthetic resin laminate. This synthetic resin layer preferably has high physical properties such as shock absorbing properties or penetration resistance. For example, it is made of e.g. polyurethane, polyvinylbutyral or a polyvinylbutyral-polyethylene terephthalate having shock absorbing properties and penetration resistance. When the substrate is a laminate comprising two sheets of inorganic glass with an interlayer interposed therebetween, the above-mentioned polyurethane surface layer may be formed directly on one side thereof. On the other hand, when the substrate is a hard organic glass such as polycarbonate or acrylic resin, it is preferred to form the above polyurethane surface layer on each side thereof, whereby excellent surface properties will be imparted to the hard organic glass.

The above-mentioned bilayer safety glass is preferably prepared by bonding an inorganic glass sheet and a film or sheet of a synthetic resin having high physical properties provided on one side with the polyurethane surface layer (hereinafter referred to simply as a prelaminated sheet), if necessary, by using an adhesive. This prelaminated sheet may be prepared, for example, by a method disclosed in U.S. Pat. No. 4,643,944. For instance, it may be prepared by casting and reaction-curing the composition of the present invention on a support and then forming thereon a synthetic resin layer having high physical properties. The formation of the synthetic resin layer is preferably conducted by casting and reaction-curing a reaction curable composition capable of forming a polyurethane having high physical properties when reaction-cured. Otherwise, the synthetic resin layer may be formed by a method wherein a solution or dispersion of the synthetic resin is coated, followed by drying, or a method wherein a preliminarily prepared synthetic resin film or sheet is laminated. When the synthetic resin layer has an adhesive property to inorganic glass, the prelaminated sheet may be bonded to the inorganic glass sheet with the surface of the synthetic resin layer as the bonding surface. When the synthetic resin layer has no adhesive property to inorganic glass or its adhesive property is low, it is preferred to bond the prelaminated sheet and the inorganic glass sheet by means of a thin layer of an adhesive interposed therebetween.

Now, the present invention will be described in further detail with reference to Examples. However, it should be understood that the present invention is by no means restricted by such specific Examples.

EXAMPLE 1

A polyisocyanate component prepared by mixing 1,6-hexane diisocyanate and an isocyanurate-modified 1,6-hexane diisocyanate to have an average equivalent molecular weight of 160 and a polyol component comprising 90 parts by weight of a mixture prepared by mixing poly($\epsilon$-caprolactone)triols having average equivalent molecular weights of 100 and 267 to have an average equivalent molecular weight of 140 and 10 parts by weight of a polycarbonate diol having an average equivalent molecular weight of 1,000, were charged together with a catalytic amount of dibutyltin dilaurate at an index of 103, and the mixture was stirred and mixed at 60° C. under reduced pressure for 2 minutes. The reaction curable composition thus obtained was spread on an inorganic glass sheet having a thickness of 3 mm and cured at 120° C. for 15 hours to obtain a transparent polyurethane layer having a thickness of 0.5 mm. The transparent polyurethane-coated glass sheet was subjected to frictional damage resistance and stain resistance tests. The coated surface of the glass sheet had the properties as identified in Table 1.

EXAMPLE 2

A transparent polyurethane-coated glass sheet was prepared in the same manner as in Example 1 except that a mixture prepared by mixing isophorone diisocyanate and an isocyanurate-modified isophorone diisocyanate to have an average equivalent molecular weight of 215 was used as the polyisocyanate component, and a mixture comprising 30 parts by weight of a triol composed of trimethylolpropane-propylene oxide adduct and having an average equivalent molecular weight of 150, 50 parts by weight of a poly($\epsilon$-caprolactone)triol having an average equivalent molecular weight of 500 and 20 parts by weight of a poly($\epsilon$-caprolactone)diol having an average equivalent molecular weight of 2,000 was used as the polyol component. The coated surface of such a glass sheet had the properties as identified in Table 1.

COMPARATIVE EXAMPLE 1

A transparent polyurethane-coated glass sheet was prepared in the same manner as in Example 1 except that a mixture prepared by mixing poly ($\epsilon$-caprolactone)triols having average equivalent molecular weights of 100 and 267 to have an average equivalent molecular weight of 140, was used as the polyol component. The coated surface of such a glass sheet had the properties as identified in Table 1.

COMPARATIVE EXAMPLE 2

A transparent polyurethane-coated glass sheet was prepared in the same manner as in Example 1 except that a mixture prepared by mixing 1,6-hexane diisocyanate and a buret-modified 1,6-hexane diisocyanate to have an average equivalent molecular weight of 105, was used as the polyisocyanate component and a mixture prepared by mixing poly($\epsilon$-caprolactone)triols having average equivalent molecular weights of 100 and 277 to have an average equivalent molecular weight of 140, was used as the polyol component. The coated surface of such a glass sheet had the properties as identified in Table 1.

COMPARATIVE EXAMPLE 3

A transparent polyurethane-coated glass sheet was prepared in the same manner as in Example 1 except that a mixture comprising 45 parts by weight of each of poly($\epsilon$-caprolactone)triols having average equivalent molecular weights of 500 and 667 and 10 parts by weight of a polyoxypropylene diol having an average equivalent molecular weight of 800, was used as the polyol component. The coated surface of such a glass sheet had the properties as identified in Table 1.

COMPARATIVE EXAMPLE 4

A transparent polyurethane-coated glass sheet was prepared in the same manner as in Example 1 except that a poly($\epsilon$-caprolactone)triol having an average equivalent molecular weight of 100 was used as the polyol component. The coated surface of such glass sheet had the properties as identified in Table 1.

TABLE 1

| Test samples | Frictional damage resistance ΔH (%) | Scratching damage resistance Load (g) | Stain resistance Removal rate (%) |
|---|---|---|---|
| Example 1 | 0.6 | >200 | 97 |
| Example 2 | 0.8 | 176 | 97 |
| Comparative Example 1 | 1.0 | 103 | 97 |
| Comparative Example 2 | 0.6 | 96 | 63 |
| Comparative Example 3 | 1.0 | 101 | 68 |
| Comparative Example 4 | 3.1 | 71 | 99 |

Frictional damage resistance: Evaluated by an increase of haze (ΔH) resulting from 100 cycle operation of a Teba type rotary abrader.
Scratching damage resistance: Evaluated by reading the load at which a permanent scratching mark is formed by using a Haden scratch tester.
Stain resistance: Evaluated by reading the removal rate of an oily ink from the white light transparency after marking with a commercially available oily ink and the white light transparency after wiping it by 100 cycle operation at a surface pressure of 100 g/cm$^2$ while supplying 2 g/min of ethanol to a wiping felt.

EXAMPLE 3

A polyisocyanate component prepared by mixing 1,6-hexane diisocyanate and an isocyanurate-modified 1,6-hexane diisocyanate to have an average equivalent molecular weight of 180 and a polyol component comprising 90 parts by weight of a mixture prepared by mixing three types of poly(ε-caprolactone)triols having average equivalent molecular weights of 100, 167 and 267 to have an average equivalent molecular weight of 160 and 10 parts by weight of a poly(ε-caprolactone)-diol having an average equivalent molecular weight of 2,000, were charged together with a catalytic amount of dibutyltin dilaurate at an index of 98, and the mixture was stirred and mixed at 60° C. under reduced pressure for 2 minutes. The mixture was spread on a polypropylene sheet and cured at 120° C. under a pressure of 20 kg/cm² to obtain a transparent polyurethane film having a thickness of 0.15 mm. Such a film was laminated on the surface of a polycarbonate sheet (A) having a thickness of 3 mm and on the surface of a polymethyl methacrylate sheet (C) having a thickness of 3 mm, respectively, by means of a thermoplastic urethane adhesive to obtain a transparent polyurethane-coated polycarbonate sheet (B) and a transparent polyurethane-coated polymethyl methacrylate sheet (D). The frictional damage resistance of these four sheets were examined. The results are shown in Table 2.

TABLE 2

| Sheets | Frictional damage resistance ΔH (%) | Scratching damage resistance Load (g) |
|---|---|---|
| (A) | 68 | <1 |
| (B) | 0.8 | >200 |
| (C) | 39 | <1 |
| (D) | 0.8 | >200 |

EXAMPLE 4

To 65 parts by weight of a polyether diol containing polyoxyethylene chains and polyoxytetramethylene chains and having an average equivalent molecular weight of 1,040 and 28.4 parts by weight of 4,4'-methylenebis(cyclohexylisocyanate), a catalytic amount of dibutyltin dilaurate was added, and the mixture was reacted at 80° C. for 20 minutes. Then, 6.6 parts by weight of 1,4-butanediol was added thereto, and the mixture was stirred and mixed for 2 minutes under reduced pressure. This reaction mixture was cured at 120° C. for 15 hours, then pulverized into chips of about 5 mm in diameter and extruded into a sheet (E) having a thickness of 0.7 mm and a sheet (F) having a thickness of 0.6 mm.

Then, a polyisocyanate component prepared by mixing 1,6-hexane diisocyanate and an isocyanurate-modified 1,6-hexane diisocyanate to have an average equivalent molecular weight of 176 and a polyol component comprising 90 parts by weight of a mixture prepared by mixing poly(ε-caprolactone)triols having average equivalent molecular weights of 100 and 267 to have an average equivalent molecular weight of 150 and 10 parts by weight of a poly(ε-caprolactone)diol having an average equivalent molecular weight of 1,000, were charged together with a catalytic amount of dibutyltin dilaurate at an index of 100, and the mixture was stirred and mixed at 60° C. under reduced pressure for 2 minutes. The mixture was spread on a polypropylene sheet and cured at 120° C. under 20 kg/cm² for 15 hours to obtain a film (G) having a thickness of 0.1 mm. This film (G) was overlaid on the film (F) and hot-pressed at 100° C. to obtain a laminated sheet (H) having a thickness of 0.7 mm.

Then, on the film (F) side of this laminated sheet (H), an inorganic glass sheet having a thickness of 3.5 mm treated with γ-glycidoxy propylsilane was pressed, and on the other film (G) side, an inorganic glass sheet to which polydimethylsiloxane was baked, was pressed. The assembly was placed in an autoclave and treated at 120° C. under vacuum of 10 mmHg for 5 minutes for lamination, followed by press-bonding treatment at 140° C. under 10 kg/cm² for 30 minutes. The assembly was taken out from the autoclave, and the inorganic glass sheet treated with polydimethylsiloxane was removed to obtain a firmly bonded polyurethane layer-inorganic glass laminate (I). In the same manner, only the film (E) was press-bonded to an inorganic glass sheet to obtain a laminate (J).

The laminates (I) and (J) had the properties as identified in Table 3.

TABLE 3

| Laminates | Frictional damage resistance ΔH (%) | Scratching damage resistance Load (g) | Stain resistance Removal rate (%) | Penetration resistance |
|---|---|---|---|---|
| (I) | 0.9 | 196 | 97 | Good |
| (J) | 1.9 | <5 | 76 | Good |

Penetration resistance: Tested and evaluated in accordance with JIS R3312.

EXAMPLE 5

To a mixture of a polyol component comprising 35 parts by weight of a polycarbonate diol containing 1,6-hexanediol residues and cyclohexane dimethanol residues and having an average equivalent molecular weight of 630, 55 parts by weight of a poly(ε-caprolactone)diol having an average equivalent molecular weight of 600 and 10 parts by weight of a poly(ε-caprolactone)triol having an average equivalent molecular weight of 280 and a polyisocyanate component comprising 50 parts by weight of 4,4'-methylenebis(cyclohexylisocyanate), 8 parts by weight of 1,4-butanediol and a catalytic amount of dibutyltin dilaurate were charged, and the mixture was stirred and mixed at 60° C. under reduced pressure for 2 minutes. The reaction curable mixture thus obtained was designated as (K).

Whereas, a polyisocyanate component prepared by mixing 1,6-hexane diisocyanate and an isocyanurate-modified 1,6-hexanediisocyanate to have an average equivalent molecular weight of 158 and a polyol component comprising 90 parts by weight of a mixture prepared by mixing poly(ε-caprolactone)triols having average equivalent molecular weights of 100 and 267 to have an average equivalent molecular weight of 152 and 10 parts by weight of a poly(ε-caprolactone)diol having an average equivalent molecular weight of 1,500 were charged together with a catalytic amount of dibutyltin dilaurate at an index of 106, and the mixture was stirred and mixed at 60° C. under reduced pressure for 2 minutes. The reaction curable mixture thus obtained was designated as (L).

Then, by means of a knife coater, the reaction curable mixture (K) was coated on an inorganic glass sheet having a thickness of 3.5 mm and treated with γ- glycidoxy propylsilane while moving the inorganic glass sheet at a rate of 20 cm/min. The coated mixture was cured at 120° C. for 15 hours. In this manner, polyurethane-inorganic glass sheet laminates (M) and (N) having a polyurethane layer thickness of 1 mm and 0.85 mm, respectively, were prepared.

In a similar manner, the reaction curable mixture (L) was coated on the polyurethane layer surface of the laminate (N) and cured at 120° C. for 15 hours to obtain a laminate (O) having a total thickness of the polyurethane layer of 1 mm.

The laminates (M) and (O) had the properties as identified in Table 4.

EXAMPLE 6

A reaction curable mixture (P) was prepared in the same manner as in the preparation of the mixture (L) in Example 5 except that no dibutyltin dilaurate was used. The mixture (P) was dissolved in the same amount by weight of ethyl acetate. To such a solution of the mixture (P), a catalytic amount of dibutyltin dilaurate was added, and the laminate (M) obtained in Example 5 was dipped therein at a rate of 30 cm/min and withdrawn. The laminate was dried at 60° C. for 1 hour and then subjected to heat treatment at 120° C. for 15 hours to obtain a polyurethane-inorganic glass sheet laminate (Q) having a polyurethane layer of 34 μm derived from the reaction curable mixture (P).

The laminate (Q) had properties as shown in Table 4.

TABLE 4

| Laminates | Frictional damage resistance ΔH (%) | Scratching damage resistance Load (g) | Stain resistance Removal rate (%) | Penetration resistance |
|---|---|---|---|---|
| (M) | 0.5 | 100 | 73 | Good |
| (O) | 0.8 | >200 | 97 | Good |
| (Q) | 0.5 | 190 | 95 | Good |

The polyurethane surface layer formed by the present invention is formed by a polyisocyanate component and a polyol component having specific compositions, whereby remarkably improved self healing properties and high degrees of frictional damage resistance and stain resistance are obtainable. Such effects are useful for a wide range of application fields. They are particularly useful in the fields of architecture and interior, exterior and glazing material for automobiles.

What is claimed is:

1. A reaction curable composition comprising, as reactive materials, (a) a polyisocyanate component comprising a diisocyanate and a tri or higher functional polyisocyanate having an average equivalent molecular weight of from 120 to 240, (b) a polyol component comprising 2-20 wt. %, based on the total polyol component, of a diol having an average equivalent molecular weight of from 500 to 3000 and 30-90wt. %, based on the total polyol component, of a tri or higher functional polyol having an average equivalent molecular weight of from 90 to 550.

2. The composition according to claim 1, wherein both the diisocyanate and the tri or higher functional polyisocyanate are non-yellowing polyisocyanates.

3. The composition according to claim 1, wherein the polyisocyanate component contains at least 3 equivalent % of an isocyanate group derived from the diisocyanate and at least 30 equivalent % of an isocyanate group derived from the tri or higher functional polyisocyanate.

4. The composition according to claim 3, wherein the polyisocyanate component contains from 5 to 40 equivalent % of an isocyanate group derived from the diisocyanate and from 60 to 95 equivalent % of an isocyanate group derived from the tri or higher functional polyisocyanate.

5. The composition according to claim 1, wherein the diol has an average equivalent molecular weight of from 500 to 3,000, and the tri or higher functional polyol has an average equivalent molecular weight of from 90 to 500.

6. The composition according to claim 1, wherein the polyol component contains from 5 to 20% by weight of the diol and from 60 to 90% by weight of the tri or higher functional polyol.

* * * * *